(12) United States Patent
Kawabe

(10) Patent No.: US 6,324,055 B1
(45) Date of Patent: Nov. 27, 2001

(54) MOBILE INFORMATION PROCESSING APPARATUS AND COVERS FOR THE MOBILE INFORMATION PROCESSING APPARATUS AND THE DESKTOP INFORMATION PROCESSING APPARATUS

(75) Inventor: Shin Kawabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/160,320

(22) Filed: Sep. 25, 1998

(30) Foreign Application Priority Data

Jun. 18, 1998 (JP) .................................... 10-171342

(51) Int. Cl.$^7$ ............................... H05K 7/20; G06F 1/20
(52) U.S. Cl. .................... 361/687; 361/686; 361/690; 361/697; 361/688; 361/705; 361/714
(58) Field of Search .................... 361/687, 704, 361/707, 709, 710, 706, 708, 712, 713, 679, 680, 681, 683, 686, 688, 690, 697, 705, 714; 165/146, 80.3, 185

(56) References Cited

U.S. PATENT DOCUMENTS

| | | | |
|---|---|---|---|
| 4,603,731 | * | 8/1986 | Olsen ..................................... 165/41 |
| 4,867,235 | * | 9/1989 | Grapes et al. ......................... 165/185 |
| 5,077,637 | * | 12/1991 | Martoranan et al. ................. 361/386 |
| 5,390,734 | * | 2/1995 | Voorhes et al. ....................... 165/185 |
| 5,566,752 | * | 10/1996 | Arnold et al. ......................... 165/185 |
| 5,661,637 | * | 8/1997 | Villaume ............................... 361/687 |
| 5,766,691 | * | 6/1998 | Arnold et al. ......................... 427/450 |
| 5,825,624 | * | 10/1998 | Arnold et al. ......................... 361/708 |
| 5,992,155 | * | 11/1999 | Kobayashi et al. ..................... 62/3.7 |
| 6,052,280 | * | 4/2000 | Dilley et al. .......................... 361/687 |

FOREIGN PATENT DOCUMENTS

| | | |
|---|---|---|
| 60-135946 | 7/1985 | (JP) . |
| 4-8126 (A) | 1/1992 | (JP) . |
| 08087354 A | 4/1996 | (JP) . |
| 08204373 A | 8/1996 | (JP) . |
| 08261672 A | 10/1996 | (JP) . |
| 09006481 A | 1/1997 | (JP) . |
| 11-153099 | * 9/1997 | (JP) ............................... F04D/29/58 |

* cited by examiner

Primary Examiner—Leo P. Picard
Assistant Examiner—Anatoly Vortman
(74) Attorney, Agent, or Firm—Burns, Doane, Swecker & Mathis, LLP

(57) ABSTRACT

A mobile information processing apparatus of the present invention having a main body and a display unit that opens and closes, attempts to improve heat releasing efficiency by allowing a transfer of heat which is released from a heat generating unit of the main body to the display unit, so that the heat is also spread to the display unit, without making the configuration complex. In order to do so, a thermally conductive material having a flexible property is placed on the main body and the display unit of the mobile information processing apparatus. Further, the thermally conductive material includes a thermally conductive sheet made of a thermally conductive fiber that has a high thermal conductivity and an outer cover such as leather. The thermally conductive sheet will be attached to CPU of the main body.

14 Claims, 8 Drawing Sheets

MOBILE INFORMATION PROCESSING APPARATUS AND COVERS FOR THE MOBILE INFORMATION PROCESSING APPARATUS AND THE DESKTOP INFORMATION PROCESSING APPARATUS

BACKGROUND OF THE INVENTION

1. Field of the Invention

The present invention relates to mobile information processing apparatus such as notebook computer, mobile information processing apparatus cover, and desktop information processing apparatus such as desktop computer.

2. Background Arts

As a result of pursuing for a small-sized mobile information processing apparatus of recent years, much of the mobile information processing apparatus nowadays spreads heat from a surface of its main body having installed a heat-generating CPU (Central Processing Unit). However, in accordance to a progress being made on a high-speed CPU, an amount of heat generated from the CPU will also increase extensively, which leaves us with a problem of how to improve efficiency of heat spreading.

FIG. 11 illustrates a side view of conventional mobile information processing apparatus disclosed in Japanese unexamined patent publication HEI 8-261672. In the conventional mobile information processing apparatus, the amount of heat generated from the main body installing CPU is several times larger than an amount of heat released from a display unit provided with a screen display. In spite of this, outer surface areas of the main body and the display unit are approximately equal. Attending to this fact, the conventional mobile information processing apparatus has improved an efficiency of heat spreading by transferring the heat generated at the main body to the display unit, so that the transferred heat is also released from the outer surface of the display unit.

Description of the numbered components in the drawing of FIG. 11 follows: a main body 401 of the mobile information processing apparatus where a keyboard 402 is being placed on at an inner surface of the main body 401; a circuit board 403 installed at the main body 401 where a CPU 404 is mounted on; a heat collecting board 405 mounted on a top surface of the CPU 404; a display unit 406 of the mobile information processing apparatus; a liquid crystal display panel 407 placed at an inner surface of the display unit 406; a heat spreading board 408 mounted on an external surface of the display unit 406; a connecting unit 409 that connects the main body 401 and the display unit 406; a hinge 410 situated inside the connecting unit 409 and above the main body 401; a first heat pipe 411 installed at the main body 401; and a second heat pipe 412 installed at the display unit 406. The first heat pipe 411 and the second heat pipe 412 are connected at the hinge 410 via a rotating circular plate. The circular plate rotates when the display unit 406 is being closed on top of the main body 401.

The heat generated at the main body 401 is transferred to the display unit 406 through the first heat pipe 411 and the second heat pipe 412. The heat pipes cause to a complexity of an internal structure of the conventional mobile information processing apparatus. In addition, the heat pipes must be incorporated from an early stage of designing. Therefore, the heat pipes have a problem such as unable to deal with a grade-up of the CPU and unable to use a PC card that has an unexpected electricity consumption.

At the same time, since a ground line and a signal line that electrically connects the main body 401 and the display unit 406 must pass through a narrow space in vicinity of the connecting unit 409 through the hinge 410, because of this the ground line and the signal line should be made thin. The thin lines lacks in firm electronic connection and this may cause an occurrence of blur in the display panel, and further, with a repeated opening and closing of the display unit 406 the lines may be cut off.

In many cases, a cover is placed over the mobile information processing apparatus for reasons such as absorbing shock from outside, viewpoint of design, and easy carrying. Japanese unexamined utility model publication HEI 4-3126 discloses a conventional book type cover for the mobile information processing apparatus.

FIGS. 12 and 13 illustrate the book type cover for the conventional mobile information processing apparatus. FIG. 12 is an external view of the mobile type information processing apparatus covered by the book type cover when the display unit is being closed. FIG. 13 is the external view of the mobile information processing apparatus covered by the book type cover when the display unit is being opened.

Description of the numbered components in the drawings follows: a mobile type information processing apparatus 501 comprising a main body 502 and a display unit 503; the book type cover for the mobile information processing apparatus 601 comprising of two parts including a part that covers the main body 502 and a part that covers the display unit 503 of the mobile information processing apparatus; straps 602 which bring together the cover 601 with the main body 502 and the display unit 503; a handle 603 attached to the cover 601; and shoulder strap rings 604 attached to the cover 601.

However, this type of cover includes no means to deal with heat, so when the cover is being used to cover the mobile type information processing apparatus that spreads heat from the outer surface of the main body, the heat cannot sufficiently be released from the outer surface due to this kind of cover. This kind of cover causes a problem of increased temperature inside the main body of the mobile information processing apparatus.

SUMMARY OF THE INVENTION

The present invention attempts to solve the problems mentioned previously. The first aim of the invention is to supply a mobile information processing apparatus having an improved heat spreading efficiency, without making the configuration of the apparatus complex.

The second aim of the invention is to supply a mobile information processing apparatus with an intensified electronic connection between the main body and the display unit so that even after opening and closing the display unit for a numerous number of times, wear and tear of the ground line and the signal line that connects the main body and the display unit can be reduced.

The third aim of the invention is to supply a cover for the mobile information processing apparatus, which can improve the heat spreading efficiency.

According to one aspect of the present invention, a mobile information processing apparatus comprises: a main body including a heat generating unit; a display unit for its opening and closing; and a thermally conductive material for transferring and releasing heat generated at the heat generating unit. The thermally conductive material is flexible and is placed to the main body and the display unit.

According to another aspect of the present invention, the mobile information processing apparatus includes one part of the thermally conductive material forming an outer surface of the display unit.

According to another aspect of the present invention, the mobile information processing apparatus includes one part of the thermally conductive material forming an outer surface of the main body.

According to another aspect of the present invention, the mobile information processing apparatus includes the thermally conductive material having an outer cover at its outer surface.

According to another aspect of the present invention, the mobile information processing apparatus includes the thermally conductive material having a thermally conductive sheet having a flexible property.

According to another aspect of the present invention, the mobile information processing apparatus includes the thermally conductive material which comprises a plurality of thermally conductive sheets having a flexible property. The thermally conductive sheets are piled up in layers.

According to another aspect of the present invention, the mobile information processing apparatus includes a number of the plurality of thermally conductive sheets which can arbitrary be adjusted.

According to another aspect of the present invention, the mobile information processing apparatus includes the thermally conductive sheet which is made of a thermally conductive fiber.

According to another aspect of the present invention, the mobile information processing apparatus includes the thermally conductive sheet which is made of a metallic film.

According to another aspect of the present invention, the mobile information processing apparatus comprises the main body which includes a circuit board having ground, and the display unit which includes a circuit board having ground. The thermally conductive sheet is electronically connected to the grounds of the circuit boards of the main body and the display unit.

According to another aspect of the present invention, the mobile information processing apparatus comprises the thermally conductive material including a cable for electronically connecting the main body and the display unit.

According to another aspect of the present invention, a cover of the mobile information processing apparatus having a heat generating unit comprises a thermally conductive material for conducting and releasing heat generated at the heat generating unit. The thermally conductive material has a flexible property.

According to another aspect of the present invention, the cover of the mobile information processing comprises the thermally conductive material including a thermally conductive sheet having a flexible property.

According to another aspect of the present invention, the cover of the mobile information processing apparatus comprises the thermally conductive material including a plurality of the thermally conductive sheets having flexible property. The thermally conductive sheets are piled up in layers.

According to another aspect of the present invention, the cover of the mobile information processing apparatus includes a number of the thermally conductive sheets which can arbitrary be adjusted.

According to another aspect of the present invention, the cover of the mobile information processing apparatus comprises the thermally conductive sheet which is made of a thermally conductive fiber.

According to another aspect of the present invention, the cover of the mobile information processing apparatus includes the thermally conductive sheet which is made of a metallic film.

According to another aspect of the present invention, a desktop information processing apparatus having a chassis and a heat generating unit inside the chassis comprises a thermally conductive sheet made of a flexible thermally conductive fiber, for attaching on a surface of the chassis, and further for attaching to the heat generating unit.

According to another aspect of the present invention, the desktop information processing apparatus according further comprises a heat spreading board for conducting a heat generated from the heat generating unit inside the chassis. The heat spreading board is placed in between the thermally conductive sheet and the heat generating unit.

According to another aspect of the present invention, the desktop information processing apparatus includes the thermally conductive sheet which is connected at a rear of the chassis and a top of the chassis, and, the thermally conductive sheet is inserted to an inner part of the chassis from an insertion opened at the rear of the chassis, and an inserted thermally conductive sheet is attached to the heat generating unit.

According to another aspect of the present invention, the desktop information processing apparatus includes the thermally conductive sheet which is connected at a rear of the chassis and a sides of the chassis, and, the thermally conductive sheet is inserted to an inner part of the chassis from an insertion opened at the rear of the chassis, and an inserted thermally conductive sheet is attached to the heat generating unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
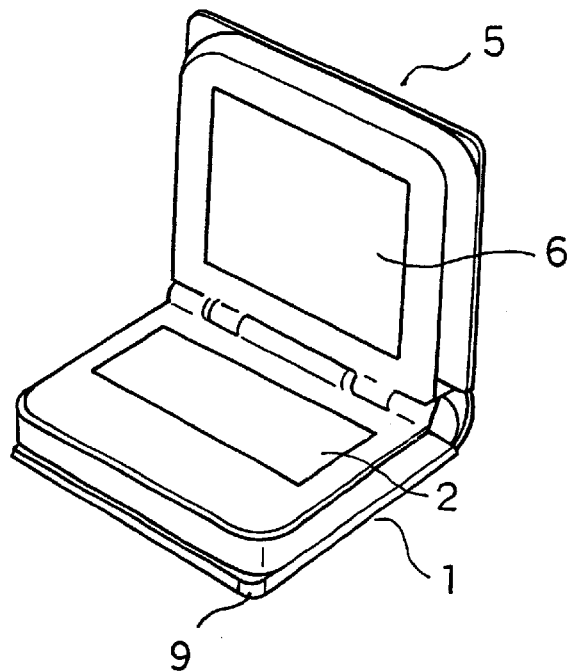
FIG. 1 is an external view of the mobile information processing apparatus of embodiment 1 of the present invention.

Reference will now be made in detail to the present preferred embodiments of the invention, examples of which are illustrated in the accompanying drawings, wherein like reference numerals indicate like elements throughout the several views.

Embodiment 1

Figure 2:
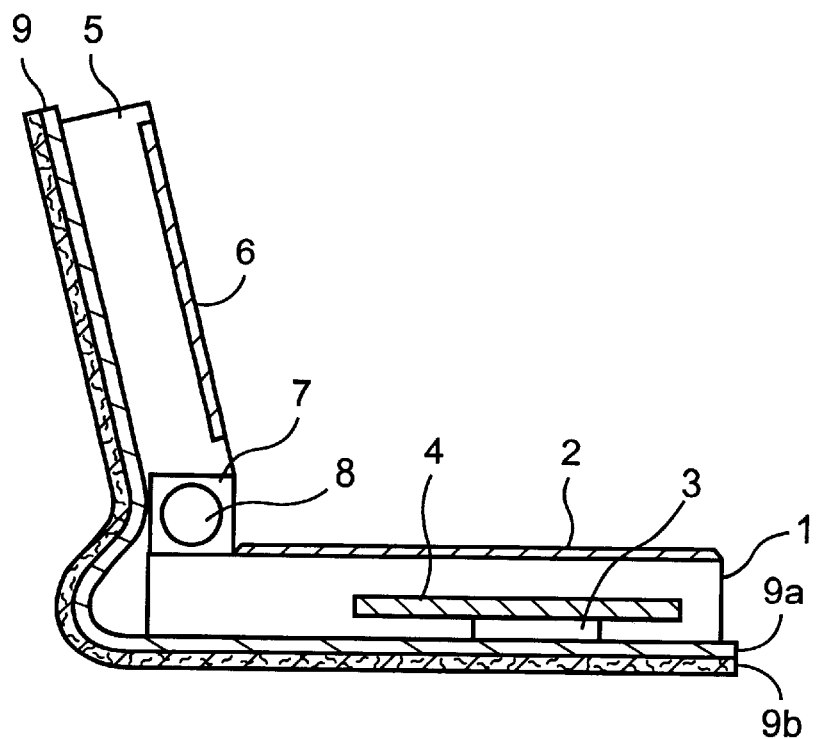
FIG. 2 is a lateral cross section of the mobile information processing apparatus of embodiment 1 of the present invention.

FIGS. 1 and 2 illustrate a mobile information processing apparatus of the present invention. FIG. 1 illustrates the external view of the mobile information processing apparatus. FIG. 2 illustrates the lateral cross section of the mobile information processing apparatus.

Description of the numbered components in the drawings follows: a main body 1 of the mobile information processing apparatus; a keyboard 2 placed at the inner surface of the main body; a CPU 3; a circuit board 4 where the CPU 3 is mounted on in such a way inside the main body 1 so that a surface of the CPU 3 is facing the outer surface of the main body 1; a display unit 5 of the mobile information processing apparatus where a liquid crystal display panel 6 is installed at its inner surface; and a connecting unit 7 that connects the main body 1 and the display unit 5 placed on the main body 1 and having a hinge 8. The display unit 5 is joined at the hinge 8 to allow for its free opening and closing.

A thermally conductive material 9 having a flexible property is used for releasing and conducting heat, and comprises two layers including a thermally conductive sheet 9a made of thermally conductive fiber material having a flexible property with an excellent thermal conductivity such as graphite and carbon, and a thin outer cover 9b made of such material as leather for covering the thermally conductive sheet 9a. As an example of the thermally conductive fiber having a flexible property with an excellence in thermal conductivity, there is "Panasonic graphite" of Matsushita Denki Sangyo.

The outer surfaces of the main body 1 and the display unit 5 are formed by the thermally conductive material 9, which has a same width throughout. Keeping the same width, the thermally conductive material 9 are not adhered to the connecting unit 7 or to a rear end of the main body 1. Accordingly, when opening the display unit 5, a loose portion is formed in between the thermal conductive material 9 that forms the outer surface of the main body 1 and the thermal conductive material 9 forming the outer surface of the display unit 9. Also, the surface of CPU 3 placed to face the outer surface of the main body 1 is attaching to the thermally conductive sheet 9a.

For this kind of configuration, the heat generated from the CPU 3 in the main body 1 is transferred to the thermally conductive sheet 9a. In the thermally conductive sheet 9a, the heat is dissipated and transferred throughout the whole surface including the outer surfaces of the main body 1 and the display unit 5, and then the heat is released from the whole surface to outside via the outer cover 9b.

Accordingly, since the thermally conductive material 9 having a flexible property is attached to the main body 1 and the display unit 5, a heat conduction from the main body 1 to the display unit 5 is easily performed without making the inner structure of the mobile information processing apparatus complex, and it is possible to release the heat from the display unit 5 to outside.

Since the outer surfaces of the main body 1 and the display unit 5 are formed by the thermally conductive material 9 having a flexible property, the heat generated at the CPU 3 is possible to be released from the outer surfaces of the main body 1 and the display unit 5, such that the heat spreading process efficiency is brought up high. At the same time, there will no longer be a local occurrence of high temperature in the outer surface of the main body, which can avoid an unpleasant perception perceived when being used on a lap of user.

Since the outer cover 9b made of such material as leather is formed on the outer surface of the thermally conductive material 9, this can enhance the design and appearance of the mobile information processing apparatus. According to the conventional mobile information processing apparatus after flattening and smoothening a metal or a plastic surface of the mobile information processing apparatus, paint need be applied or an appearance of silk need be given involving extra processes and expenses. In the mobile information processing apparatus of the present invention, the thermally conductive material 9 brings about the design and the appearance, at the same time, such that the designing process is simple and inexpensive, in addition to that, various type of designs can be implemented easily by simply changing the outer cover.

On the other hand, instead of only using the thermally conductive material 9 having a flexible property, the outer surfaces of the main body 1 and the display unit 5 can be formed by a metallic plate for conducting and releasing the heat, and a thermally conductive material having a flexible property is placed to attach with the metallic plates of the main body 1 and the display unit 5.

Also, a thickness of the thermally conductive sheet 9a of the thermally conductive material 9 forming the outer surfaces of the main body 1 and the display unit 5 can be made thicker than the thermally conductive sheet 9a forming other parts. In general, larger an effective cross section, the greater the heat conductive property, and because of this the heat dissipation at the main body 1 and the display unit 5 becomes faster to improve a heat releasing efficiency. By increasing the thickness of thermally conductive sheet 9a, its flexibility drops, however, there is no requirement of flexible property in parts corresponding to the outer surfaces of the main body 1 and the display unit 5, so that there will be no problem in increasing the thickness of the thermally conductive sheet 9a.

Also, instead of using the outer cover 9b as the outer surfaces of the thermally conductive material 9 forming the outer surface of the main body 1 and the display unit 5, an exterior plate made of a hard material such as resin may be used. Although using this exterior plate, it is still possible to release the heat from the thermally conductive sheet 9a to the outside via the exterior plate, and to bring the same effect as when the outer cover is being used.

Also, instead of attaching the thermally conductive sheet 9a directly to the CPU 3, a metallic block or a thermally conductive rubber may be placed in between for an indirect attachment. Still, the heat of CPU 3 is transferred to the thermally conductive sheet 9a, and it is possible to dissipate and release the transferred heat.

Embodiment 2

In addition to the mobile information processing apparatus in FIG. 1 of embodiment 1, the thermal conductive sheets that are thin and made of the thermally conductive fiber are piled up in layers on top of the thermally conductive material having a flexible property.

In general, a strength of object (degree of non-flexibility) increases proportional to third power of a thickness of the object. The strength of an object having been piled up by a plurality of layers are a total sum of respective strengths of the objects. Therefore, when the same strength is provided, the thickness as a whole is increased by piling up a plurality of thin thermally conductive sheets in layers rather than just a single thermally conductive sheet. The larger the effective cross section, the thermal conductivity increases, such that by piling up the plurality of thin thermally conductive sheets in layers, the thermal conductivity from the main body to the display unit is increased at the same strength, and the heat is transferred throughout the surfaces so that the heat spreading efficiency is improved. Also, flexibility increases for the case of using the plurality of thin thermally conductive sheets being piled up in layers having the same thickness as the case of using the single thermally conductive sheet, therefore, wear and tear at the loose portion between the thermally conductive material forming the outer surface of the main body and the thermally conductive material forming the outer surface of the display unit is reduced.

Instead of the thermally conductive sheet, a metallic thin film such as aluminum or steel can be used. The flexibility is still obtained this way, and because the metal is excellent thermal conductor, therefore, the same effect as the case of using the thermally conductive fiber is obtained. An excellent conductive property of the metallic thin film can further be improved by using the metallic thin film made of pure aluminum metal and steel because the conductive property increases when the purity of material increases.

A number of the thermally conductive sheets can be made changeable. The user can make an arbitrary change in the number of thermally conductive sheets by increasing or decreasing it. When the number of thermally conductive sheets is increased, the heat dissipation becomes faster. With such adjustment of the number of thermally conductive sheets, the heat condition can preferably be adjusted.

Embodiment 3

Figure 3:
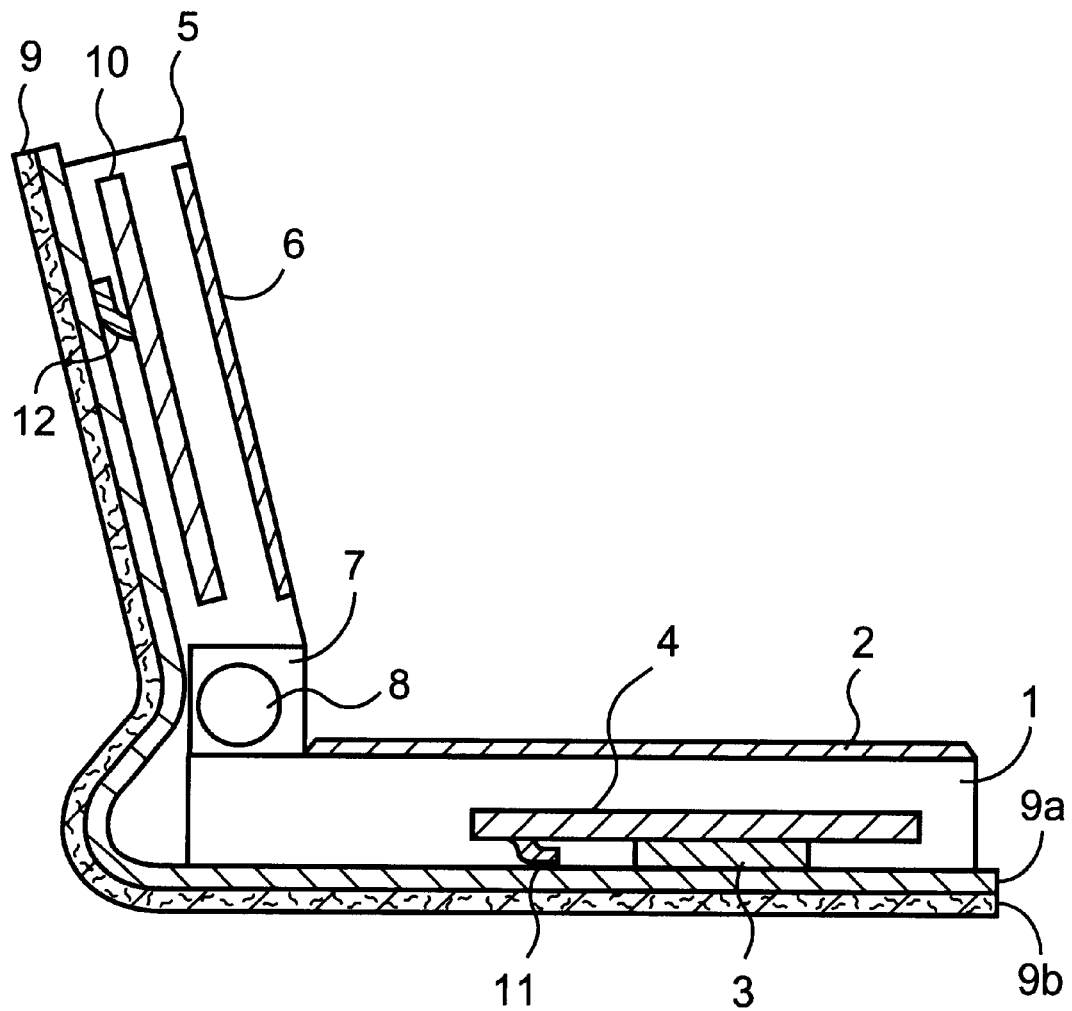
FIG. 3 is a lateral cross section of the mobile information processing apparatus of embodiment 3 of the present invention.

FIG. 3 illustrates the lateral cross section of the mobile information processing apparatus according to embodiment 3 of the present invention. In the drawing, a ground of the circuit board installed to the main body and the display unit of the mobile information processing apparatus of embodiment 1 is electronically connected to the thermally conductive sheet of the thermally conductive material having a flexible property.

Description of the numbered components in the drawing of FIG. 3 follows: a circuit board 10 where electronic components are placed, which is installed in the display unit 5; an electronically connecting component 11 installed to a ground of the circuit board 4 placed on the main body 1; and an electronically connecting component 12 installed to a ground of the circuit board 10 placed on the display unit 5. The electronically connecting components 11 and 12 are attached to the thermally conductive sheet 9a of the thermally conductive material 9 made of a highly conductive thermally conductive fiber.

For this kind of configuration, as an electrical resistance of the thermally conductive fiber is small, the circuit board 4, the circuit board 10, and the thermally conductive sheet 9a are electronically connected to result in an equal electrical potential. At the same time, because of a formation of large ground, the grounds of the circuit boards 4 and 10 are firmly joined electronically.

Accordingly, the large ground is secured, as well, the ground units of the circuit boards 4 and 10 are firmly joined electronically, such that the electronic connection becomes stable preventing the occurrence of blur in the display unit. At the same time, cut off of the electronic connection due to the repeated opening and closing operations resulting in the wear and tear is prevented. And even with regard to a problem of electromagnetic interference (EMI), an excellent feature is obtained.

Embodiment 4

Figure 4:
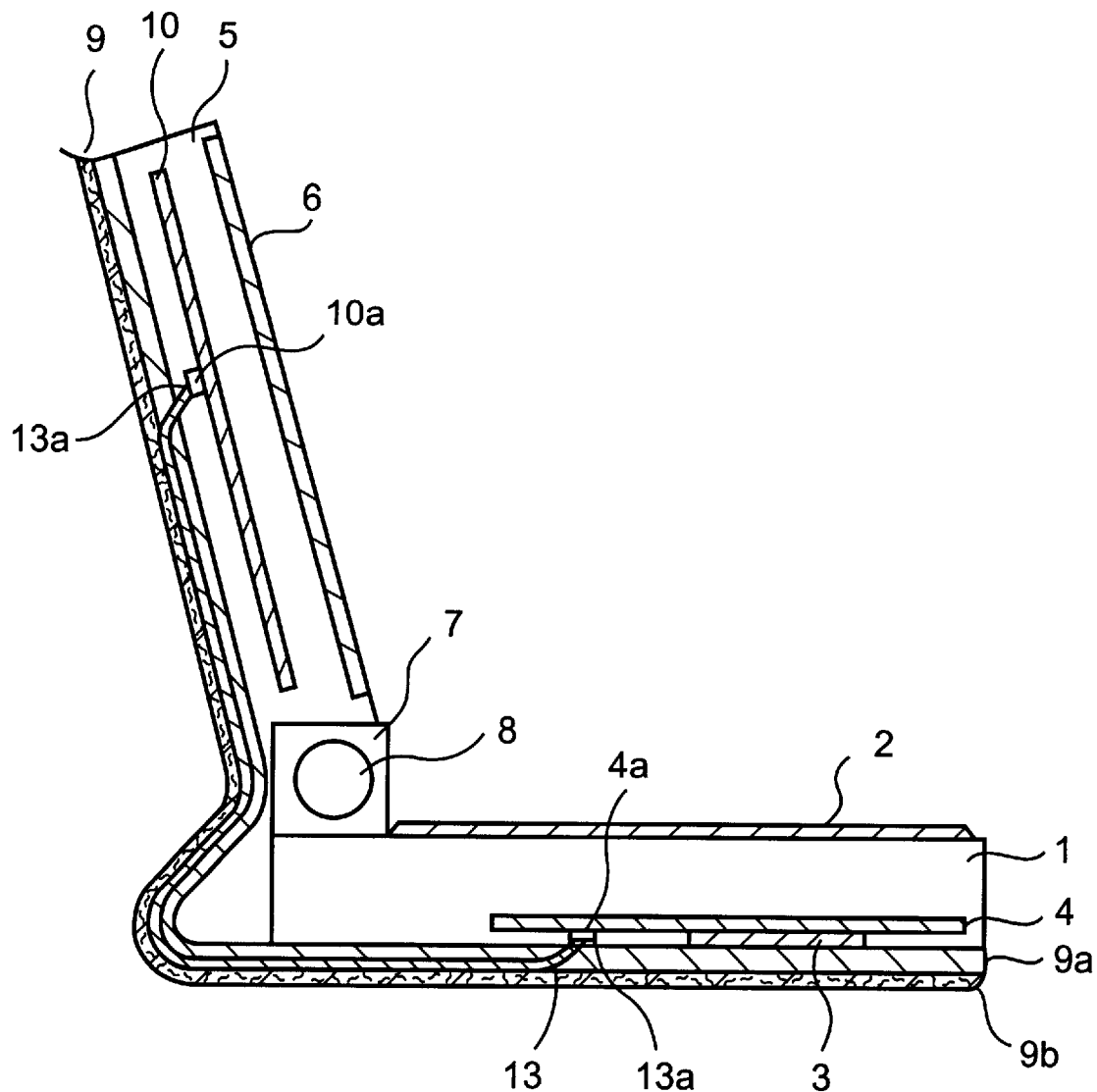
FIG. 4 is a lateral cross section of the mobile information processing apparatus of embodiment 4 of the present invention.

FIG. 4 illustrates the lateral cross section of the mobile information processing apparatus according to embodiment 4 of the present invention. In the drawing, a flexible printed circuit (FPC) for transmitting and receiving signal is placed at the circuit boards of the main body and the display unit of the mobile information processing apparatus of the embodiment 1, inside the thermally conductive material having a flexible property.

Description of the numbered components indicated in the drawing of FIG. 4 follows: the circuit board 10 where the electronic components are placed, which is installed in the display unit 5; a connector 10a for transmitting and receiving the electronic signal, which is placed in the circuit board 10; a connector 4a for transmitting and receiving the electronic signal, which is placed in the circuit board 4 of the main body 1; a flexible printed circuit (FPC) 13 incorporated in between a layer of the thermally conductive sheet 9a and a layer of the outer cover 9b so that a layer boundary plane and a cable plane are parallel; and sockets 13a located at both edges of the FPC 13, which are being exposed through the thermally conductive sheet 9a at an inner part of the main body 1 and at an inner part of the display unit 5; and connectors 4a and 10a of the circuit boards 4 and 10 joined to their respective sockets 13a.

For this kind of configuration, a deformation of the FPC 13 which occurs along with opening and closing operations of the display unit 5 can be relatively small comparatively with the conventional type. In addition, the FPC 13 is sandwiched in between the thermally conductive sheet 9a and the outer cover 9b such that a stress is dispersed.

From this, wear and tear of the FPC 13 from a repetition of the opening and closing operations of the display unit 5 is reduced, and an occurrence of cut off of the FPC is prevented.

An electronic cable of the FPC 13 can be adhered with the thermally conductive sheet 9a in a direction facing the inner surfaces of the main body 1 and the display unit 5, or alternatively the electronic cable can be placed in a layer of the thermally conductive sheet 9a.

Or, other than the FPC, other electronic cables connecting the circuit board 10 of the display unit 5 and the circuit board 4 of the main body 1 can be incorporated inside the thermally conductive material.

Embodiment 5

Figure 5:
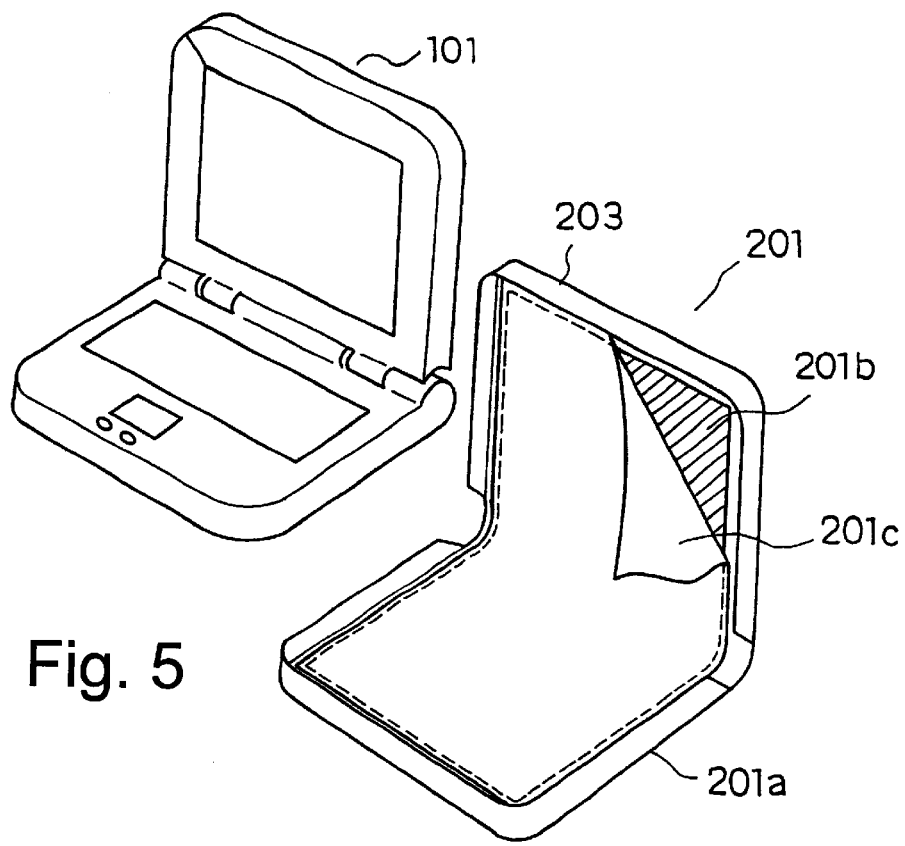
FIG. 5 is an external view of the mobile information processing apparatus cover of embodiment 5 of the present invention.
Figure 6:
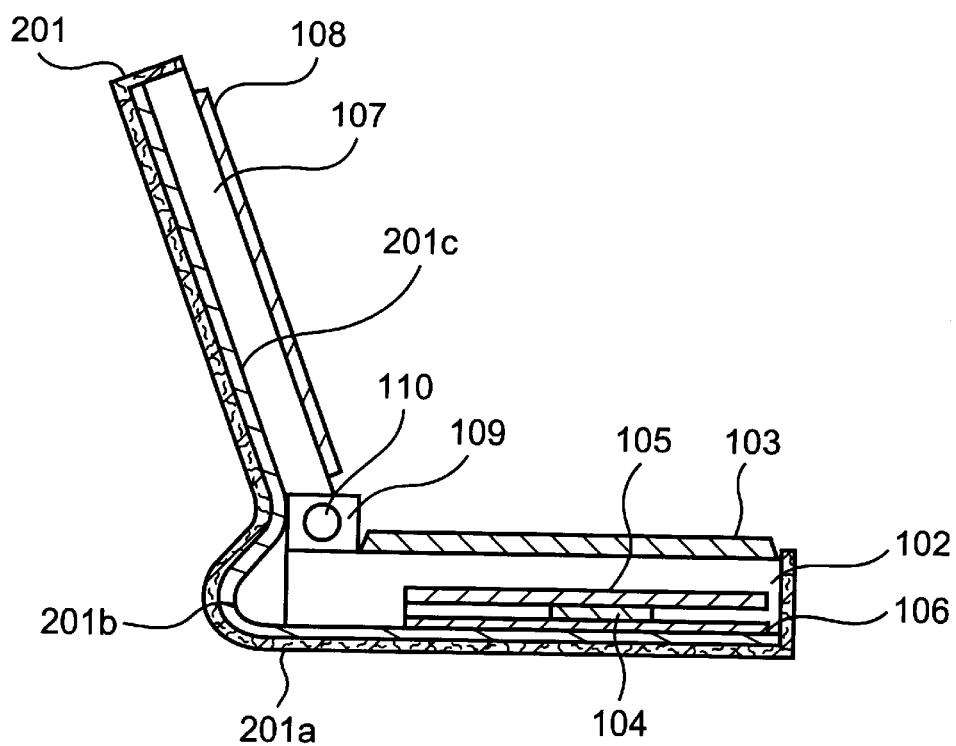
FIG. 6 is a lateral cross section of the covered mobile information processing apparatus of embodiment 5 of the present invention.

FIGS. 5 and 6 illustrate a cover for the mobile information processing apparatus according to embodiment 5 of the present invention. FIG. 5 is the external view of the cover when the display unit is open. FIG. 6 is the lateral view of the mobile information processing apparatus when the cover is placed on. For the purpose of reference to placing position of the cover, FIG. 5 illustrates a drawing of the mobile information processing apparatus next to the cover.

Description of the numbered components in the drawing of FIGS. 5 and 6 follows: a mobile information processing apparatus 101; a main body 102 of the mobile information processing apparatus 101; a keyboard 103 installed at an inner surface of the main body 102; a CPU 104; a circuit board 105 where the CPU 104 is mounted on; a heat spreading board 106 placed below the CPU 104 for dissipating and releasing heat to outside; a display unit 107 of the mobile information processing apparatus; a liquid crystal display panel 108 placed at an inner surface of the display unit 107; a connecting unit 109 for connecting the main body 102 and the display unit 107; and a hinge 110 placed inside and above the main body 102. The display unit 107 is joined at the hinge 110 to allow for its free opening and closing.

A book type cover 201 for the mobile information processing apparatus 101 comprises three layer structure which includes: an outer cover 201a made of flexible material such as leather, which is positioned at an outer layer of the outer surface of the cover 201; a thermally conductive sheet 201b made of thermally conductive fiber that is flexible, and that is excellent in the heat conductive property such as graphite and carbon, which is positioned at a middle layer of the inner side of the outer cover 201a; and a protection sheet 201c that are thin and made of polyimide for protecting the thermally conductive sheet 201b, which is positioned at an inner layer to touch with the mobile information processing apparatus 101. For the protection sheet 201c, the polyimide has an adhesive property at a part touching the outer surface of the main body 102 and the display unit 107 of the mobile information processing apparatus 101, so that the outer surfaces of the main body 102 and the display unit 107 are adhered to the cover 201. Accordingly, when in use, even when the display unit 107 is open, the cover 201 and the mobile information processing apparatus 101 will not slip out.

The cover 201 do not touch with a rear end of the main body 102 and the connecting unit 109 of the mobile information processing apparatus 101. Accordingly, when the display unit 107 is opened, a loose portion is formed to this non-touching area.

For this kind of configuration, the heat which is generated at the CPU 104 of the mobile information processing apparatus 101 and transferred to the heat spreading board 106 is conducted to the thermally conductive sheet 201b in the cover 201 located in a part facing the heat spreading board 106. In the thermally conductive sheet 201b, the heat is dissipated and transferred to a part facing the outer surface of the display unit 107, and released to outside via the outer cover 201a.

Since the thermally conductive sheet 201b is placed facing the heat spreading board 106 of the mobile information processing apparatus 101, the heat from the CPU 104 can be released to prevent increase in temperature of the apparatus inside even if the apparatus is covered by the cover 201.

Since the thermally conductive sheet 201b is placed throughout the plane of the cover 201, the heat is spread over a wide area, including a part facing a back surface of the display unit 107 of the cover 201, and released to outside from the plane more than two times the size of heat spreading board 106, and therefore, the heat spreading efficiency is greatly improved. At the same time, since the leather is used as the outer cover 201a, this is excellent in designing point of view.

Instead of attaching the protection sheet 201c having the adhesive property to the outer surfaces of the main body 102 and the display unit 107 of the mobile information processing apparatus 101, straps may be provided to the protection sheet 201c, and the main body 102 and the display unit 107 of the mobile information processing apparatus 101 is hooked to the straps to fix it into position.

When the display unit 107 of the mobile information processing apparatus 101 is opened for using it, the cover 201 touches the outer surfaces of the main body 102 and the display unit 107, however, the cover 102 only need be touching the main body 102 for releasing the heat from the CPU 104, and a part facing the display unit 107 does not have to touch the outer surface. The part facing the display unit 107 of the cover 201 can be hanged from top of the display unit 107 without touching the outer surface of the display unit 107. This way, the heat is spread to the thermally conductive sheet 201b and released from outer surface of the cover 201.

In addition, for the purpose of carrying around, the hand strap and the shoulder strap may be attached to the cover 201.

Embodiment 6

Figure 7:
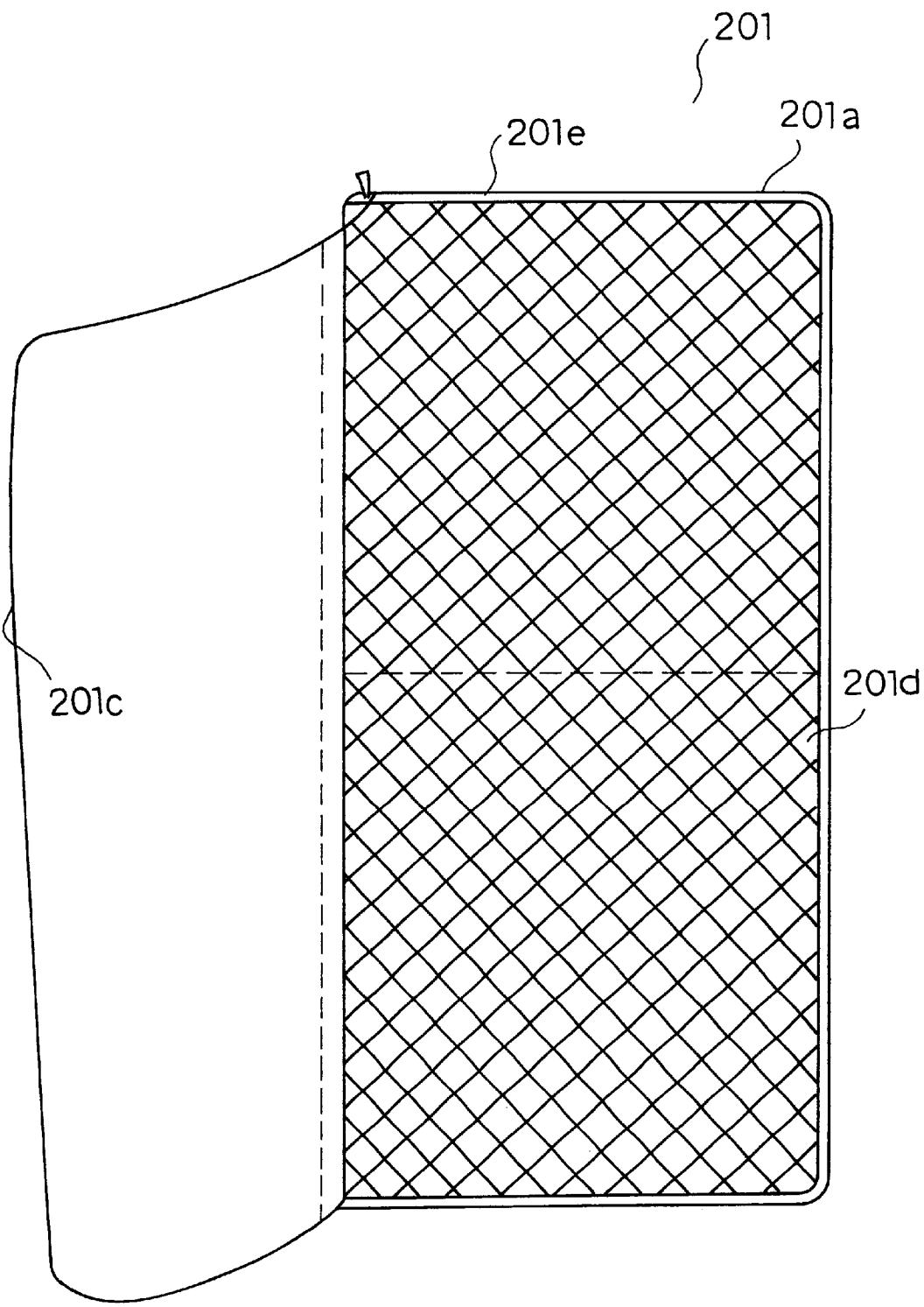
FIG. 7 illustrates the cover of the mobile information processing apparatus of embodiment 6.

FIG. 7 illustrates the cover of the mobile information processing apparatus according to embodiment 6 of the present invention. To the cover of the mobile information processing apparatus of embodiment 5 in the drawing of FIG. 5, the cover of the mobile information processing apparatus of the embodiment 6 has configuration which piles up the middle layer by a plurality of thin thermally conductive sheets made of the highly conductive thermally conductive fiber, which allows a convenient taking in and out of the thermally conductive sheets.

Description of the numbered components in the drawing of FIG. 7 follows: the book type cover 201 of the mobile information processing apparatus; the outer cover 201a made of flexible material such as leather, which is positioned at the outer layer of at the outer surface of the cover 201; a thermally conductive sheets 201d made of highly conductive thermally conductive fiber to be piled up in layers, which is positioned at the middle layer inside the outer cover 201a; and the protection sheet 201c made of thin polyimide for protecting the thermally conductive sheets 201d, which is positioned at the inner layer to touch with the mobile information processing apparatus. The outer cover 201a and the protection sheet 201c are attached together by pasting one side with the other. A zipper 201e is attached along three sides, namely: upper side, lower side, and the other one of the sides in the drawing.

In general, different types of CPU are used depending on types of the mobile information processing apparatus, therefore, the amount of heat generation also differs. Perception to temperature differs depending on the individuals. Even when sufficient amount of thermally conductive sheets are placed for cooling of the CPU, when a person uses the mobile information processing apparatus on one's lap, the person may perceive an unpleasant perception on the lap. However, for the described cover above, the user can open the zipper 201e and take out the thermally conductive sheets 201d to adjust a number of the thermally conductive sheets according to one's preference.

Accordingly, the number of thermally conductive sheets to be piled up can be adjustedby the user, therefore, when using high-speed CPU, for example, by increasing the number of thermally conductive sheets, the thermal conductivity is increased for a faster heat dissipation, allowing the heat adjustment depending on the preference and types of apparatus, such that the mobile information processing apparatus may be used in the best environment. Also, it is possible for a cover maker to provide a maximum number of the heat conductive sheets pre-loaded from the beginning, avoiding an unnecessary cost, and it is up to the individual need responding with suitable cost.

Also, the thermal conductivity is proportional to the efficient cross section, such that by piling up the plurality of thin thermally conductive fiber in layers, the thermal conductivity of the whole cover can be raised under the identical flexibility, and therefore, the heat spreading efficiency is improved.

The zipper 201e allows opening and closing of the protection sheet 201c and the outer cover 201a, and the thermally conductive sheets can be taken out, however, the protection sheet 201c can be made to have an adhesive property on both sides to form a thermally conductive tape, and the adhesive property is used to open and close the protection sheet and the outer cover.

Also, the thermally conductive sheet of the cover 201 can be made of thin metallic film such as aluminum or steel.

Embodiment 7

Figure 8:
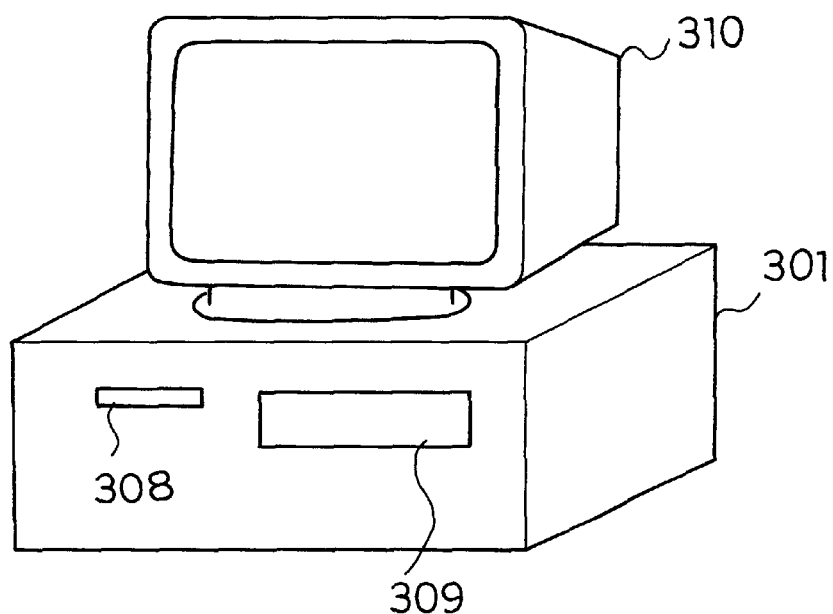
FIG. 8 is an external view of a desktop type information processing apparatus of embodiment 7 of the present invention.
Figure 9:
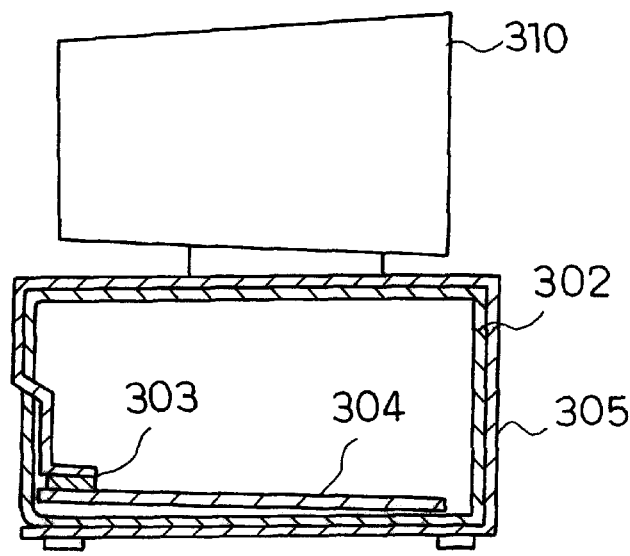
FIG. 9 is a lateral cross section of the desktop type information processing apparatus of embodiment 7 of the present invention.
Figure 10:
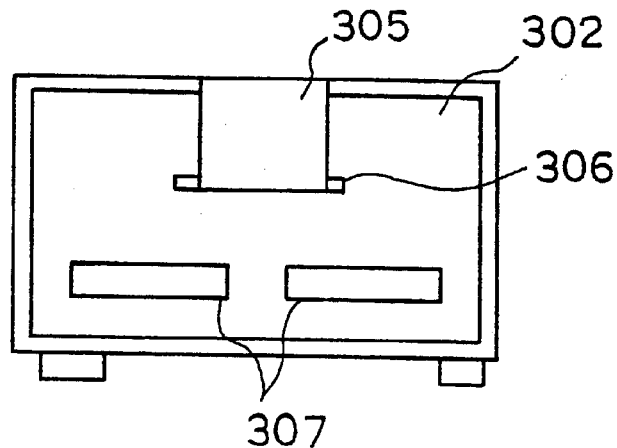
FIG. 10 illustrates a rear of the desktop type information processing apparatus of embodiment 7 of the present invention.
Figure 11:
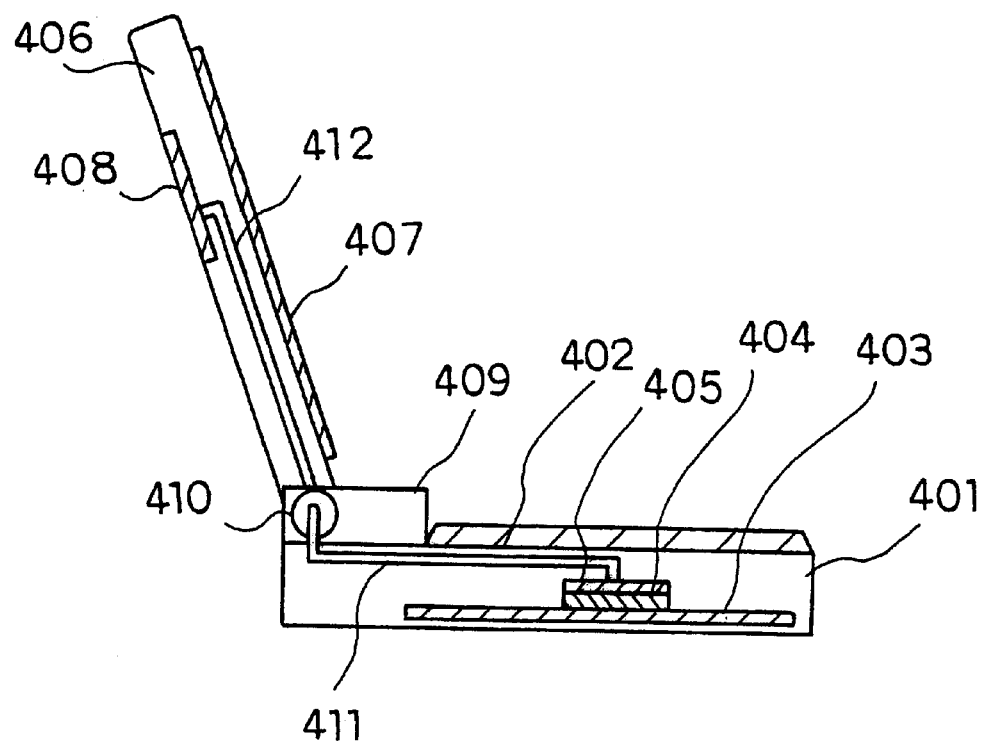
FIG. 11 is a lateral cross section of the mobile information processing apparatus of the related art.
Figure 12:
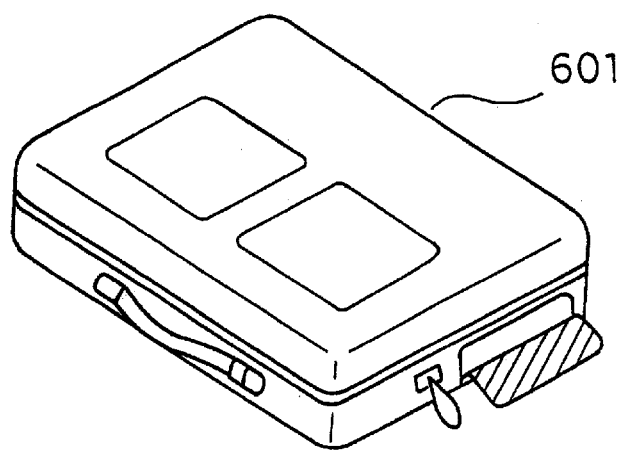
FIG. 12 is an external view of the mobile information processing apparatus of the related art when a display unit is being closed.
Figure 13:
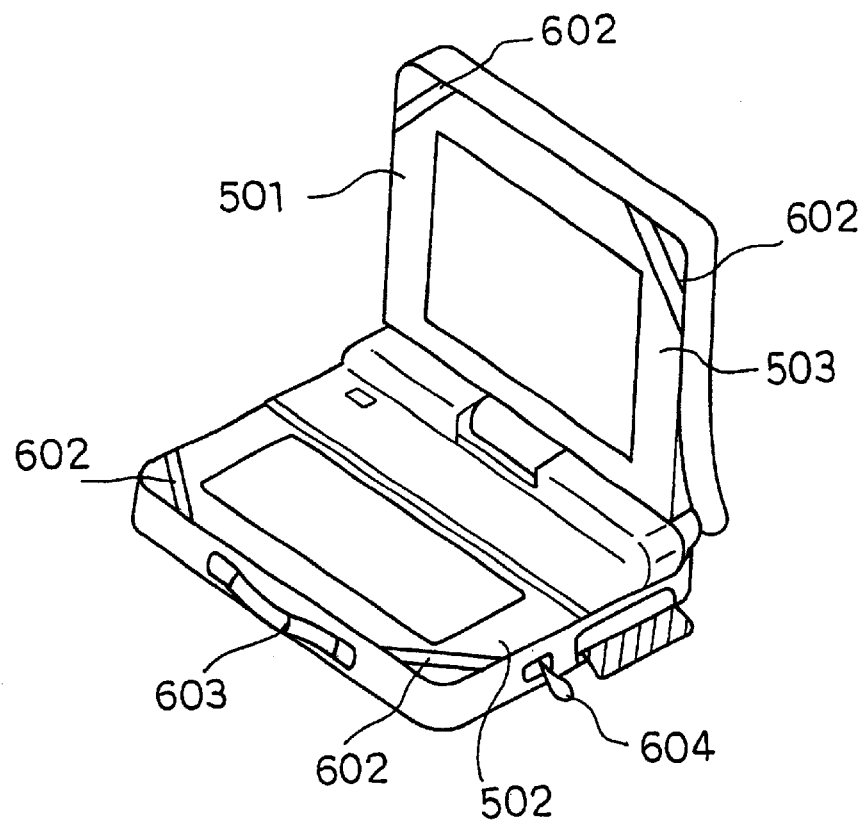
FIG. 13 is an external view of the covered mobile information processing apparatus of the related art when the display unit is being opened.

FIGS. 8, 9 and 10 illustrate a desktop computer of embodiment 7 of the invention. FIG. 8 illustrates an outline of the desktop computer. FIG. 9 illustrate the lateral cross section of the desktop computer. FIG. 10 illustrate the rear of the desktop computer.

The drawings shows a main body 301 of the desktop computer and a chassis 302 of the main body 301. A top, a front, and two sides of the chassis 302 are made of plastic. The rear and a bottom of the chassis 302 are made of metal such as aluminum plate. At an inner part of the chassis 302, a CPU 303 and a circuit board 304 where the CPU 303 is mounted on its top are placed. The CPU 303 is placed at an inner back of the chassis 302.

A thermally conductive sheet 305 is made of thermally conductive fiber such as carbon or graphite that is excellent in heat conductive property and that is flexible. The thermally conductive sheet 305 is pasted on the chassis to cover the surfaces of top, bottom, front and two sides. At the rear of the chassis 302 the thermally conductive sheet 305 is having an elongated shape, like a belt, and it is connected only to the top of chassis. Also, the thermally conductive sheet 305 touches the surface of CPU 303 by advancing into the inner chassis from an insertion 306 opened at the rear of the chassis near the CPU 303. The chassis 302 is not provided with a fan for releasing heat to outside. Further, in the front of the chassis 302, parts corresponding to an insertion 308 for floppy disks and an insertion 309 for compact disks are opened on the thermally conductive sheet 305, to allow for insertion and removal of the floppy disks and the compact disks.

Ports 307 placed at the rear of the chassis 302 is for connecting cables such as printer connecting cable and display connecting cable. A display 310 is a display of the desktop computer.

For this kind of configuration, the heat generated from the CPU 303 is transferred to the thermally conductive sheet 305 touching the CPU 303, and the heat is transferred from the rear of the chassis 302 to the top of the chassis. The heat is further conducted from the top to the two sides and the front, and then to the bottom, and then the heat spreads to the whole surface of the thermally conductive sheet 305 and released into an ambient.

Conventionally, the desktop computer does not have to be small in size, therefore, a fan is being used to release the heat generated at the CPU to outside of the chassis. However, in recent years, a combination of the desktop computer and an audio visual equipment is being considered, such that occurrence of noises need be prevented to such a desktop computer, particularly, it is no longer desirable to use the fan which causes much proportion of the noise.

By pasting the thermally conductive sheet 305 throughout the chassis 302, the heat is efficiently released to outside from the thermally conductive sheet, without the noise.

The thermally conductive sheet 305 made of thermally conductive fiber is arbitrary bent or cut for covering on the chassis 302 of desktop computer, therefore, processing is easy as well as low in cost. In the thermally conductive sheet 305, in general, heat conduction is proportional to a distance from a heat source, and as the distance from the heat source increases, a surface temperature is lowered. Due to this, in this case, from the rear which is relatively close to the CPU 303, the surface temperature is lower at a front close to the user, that is, temperature is lowered where the user might be touching, so the hotness perception perceived by the user is eliminated. The insertion 306 having an elongated shape is set at the rear of the chassis 302 such that the thermally conductive sheet 305 is inserted into the chassis 302, and it is in contact with the CPU.

At the same time, on the chassis of the desktop computer of the present invention, the top, the front and the both sides visible from outside are covered by the thermally conductive sheet 305, therefore, enormous amount of manual processes involved in regard to designing process of the conventional desktop computer, like painting the surface of the chassis made of plastic after flattening the planes is no longer necessary. Also, the insertion of the thermally conductive sheets into the inner part is installed at the rear of the chassis, therefore, there is no need to implement any particular designing process. Also, at the thermally conductive sheet 305, the elongated part positioned on the rear of the chassis 302 may be connected to the position of sides of the chassis, not the top of the chassis, and still the temperature is lowered in a front direction of the thermally conductive sheet covering the chassis 302.

By increasing the surface area of the thermally conductive sheet, the heat spreading efficiency also increases, therefore, the thermally conductive sheet is preferably extended to the rear of the display. Also, the thermally conductive sheet can be placed to the inner surface of the chassis, or leather which takes a role in designing is further placed at the outer surface of the thermally conductive sheet. Still, heat is released to outside via the leather, and effects of heat dissipation and releasing of heat is obtained.

Also, instead of attaching the thermally conductive sheet directly to the CPU, a thermally conductive plate formed by a metal can be placed to the surface of CPU, and the thermally conductive sheet made of thermally conductive fiber can be attached to the thermally conductive plate. In a case when a wiring is particularly complex close to the CPU, a friction between the wiring and the thermally conductive sheet may cause a static electricity due to a vibration. However, by using the thermally conductive plate, there is no need to place the thermally conductive sheet close to the CPU, and influences given to the devices inside the chassis by the thermally conductive sheet can be kept to a minimum.

Furthermore, two heat spreading methods of using the fan and placing the thermally conductive sheet made of thermally conductive fiber at the surface of chassis can of course be done at the same time. Due to this, a fan that consumes a less electricity can be used even when the CPU is subjected to a grading up by increasing a number of thermally conductive sheets for placing to the surface of chassis, the effect of heat spreading is increased, and able to deal with the grading up inexpensively rather than replacing the fan that has even more efficient heat spreading.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile information processing apparatus, comprising:

a main body including a heat generation unit;

a display unit for its opening and closing; and a material for transferring and releasing heat generated at the heat generation unit, the material comprising a thermally conductive sheet of a thermally conductive fiber, extending from the main body to said display unit continuously;

wherein the material is flexible and is disposed on a back side of said main body and said display unit and wherein said thermally conductive sheet is in contact with a layer which forms the outside surface of said apparatus.

2. The mobile information processing apparatus according to claim 1, wherein the material has an outer cover at its outer surface.

3. The mobile information processing apparatus according to claim 1, wherein the material comprises a plurality of thermally conductive sheets having a flexible property, wherein the thermally conductive sheets are piled up in layers.

4. The mobile information processing apparatus according to claim 3, wherein a number of the plurality of thermally conductive sheets can arbitrary be adjusted.

5. The mobile information processing apparatus according to claim 1, wherein the main body includes a circuit board having ground, and the display unit includes a circuit board having ground, wherein the thermally conductive sheet is electronically connected to the grounds of the circuit boards of the main body and display unit.

6. The mobile information processing apparatus according to claim 1, wherein the material includes a cable for electronically connecting the main body and the display unit.

7. A cover of the mobile information processing apparatus having a heat generation unit, comprising a material for conducting and releasing heat generated at the heat generation unit, wherein the material has a flexible property and comprises a thermally conductive sheet of a thermally conductive fiber, wherein said thermally conductive sheet is continuously in contact with a layer which forms the outside surface of the apparatus.

8. The cover of the mobile information processing apparatus according to claim 7, wherein the material includes a plurality of the thermally conductive sheets having flexible property, wherein the thermally conductive sheets are piled up in layers.

9. The cover of the mobile information processing apparatus according to claim 8, wherein a number of the thermally conductive sheets can arbitrary be adjusted.

10. A desktop information processing apparatus having a chassis and a heat generating unit inside the chassis comprising a thermally conductive sheet made of a flexible thermally conductive fiber, for attaching on a surface of the chassis, and further for attaching to the heat generation unit, and wherein said thermally conductive sheet forms the outside surface of the apparatus.

11. The desktop information processing apparatus according to claim 10 further comprising a heat spreading board for conducting a heat generated from the heat generating unit inside the chassis, wherein the heat spreading board is placed in between the thermally conductive sheet and the heat generating unit.

12. The desktop information processing apparatus according to claim 10, wherein the thermally conductive sheet is connected at a rear of the chassis and a top of the chassis, and, the thermally conductive sheet is inserted to an inner part of the chassis from an insertion opened at the rear of the chassis, and an inserted thermally conductive sheet is attached to the heat generating unit.

13. The desktop information processing apparatus according to claim 10, wherein the thermally conductive sheet is connected at a rear of the chassis and a sides of the chassis, and, the thermally conductive sheet is inserted to an inner part of the chassis from an insertion opened at the rear of the chassis, and an inserted thermally conductive sheet is attached to the heat generating unit.

14. A mobile information processing apparatus, comprising:

a main body including a heat generation unit;

a display unit for its opening and closing; and a material for transferring and releasing heat generated at the heat generation unit, the material comprising a thermally conductive sheet made of a metallic film, extending from the main body to said display unit continuously;

wherein the material is flexible and is disposed on a back side of said main body and said display unit and wherein said thermally conductive sheet is in contact with a layer which forms the outside surface of said apparatus.

* * * * *